Oct. 29, 1968      R. E. CHIABRANDY      3,407,701
GAS DRIVE FOR A ROTATING BARREL GUN
Filed July 17, 1967      2 Sheets-Sheet 1
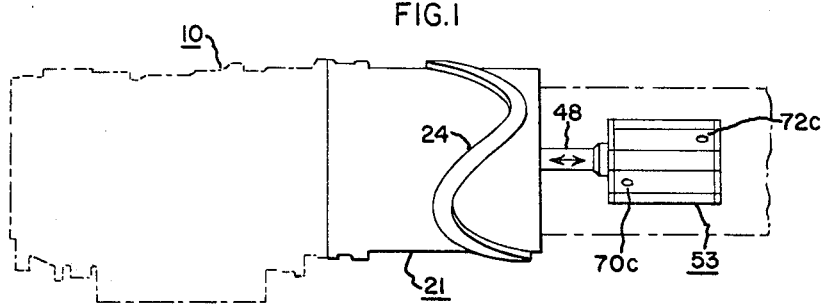
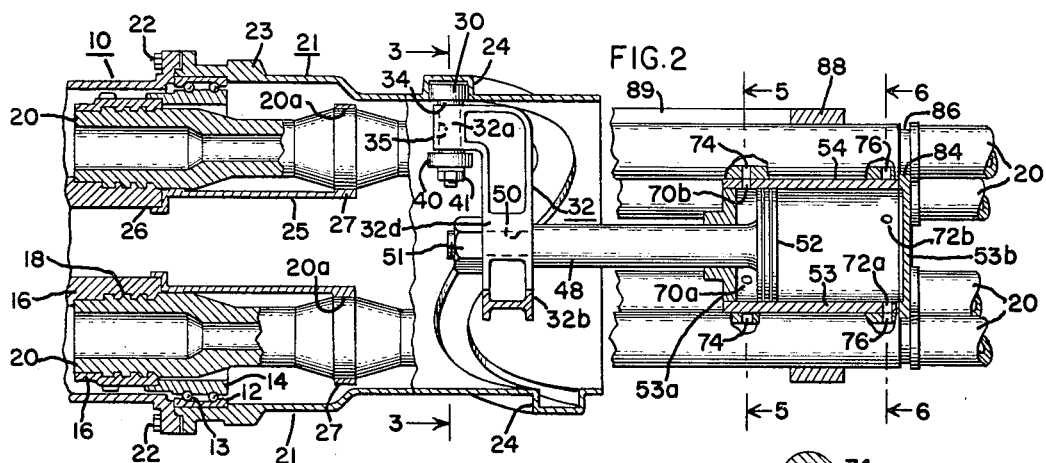
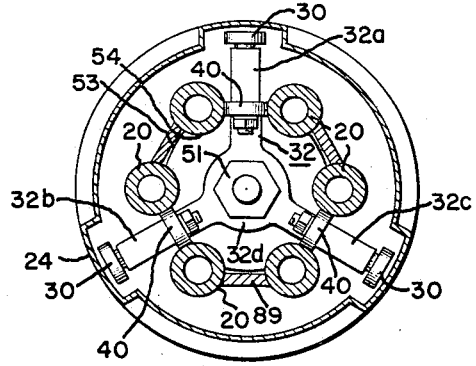
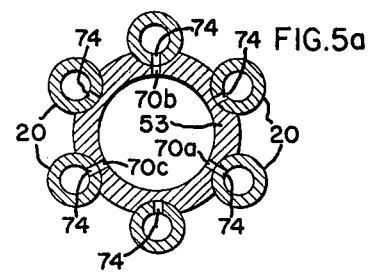
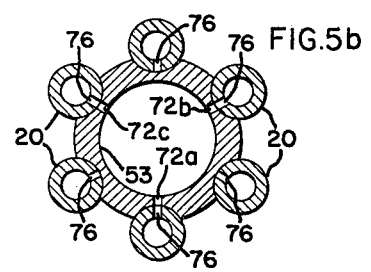
INVENTOR:
ROBERT E. CHIABRANDY,
BY *Harry C. Burgess*
HIS ATTORNEY.

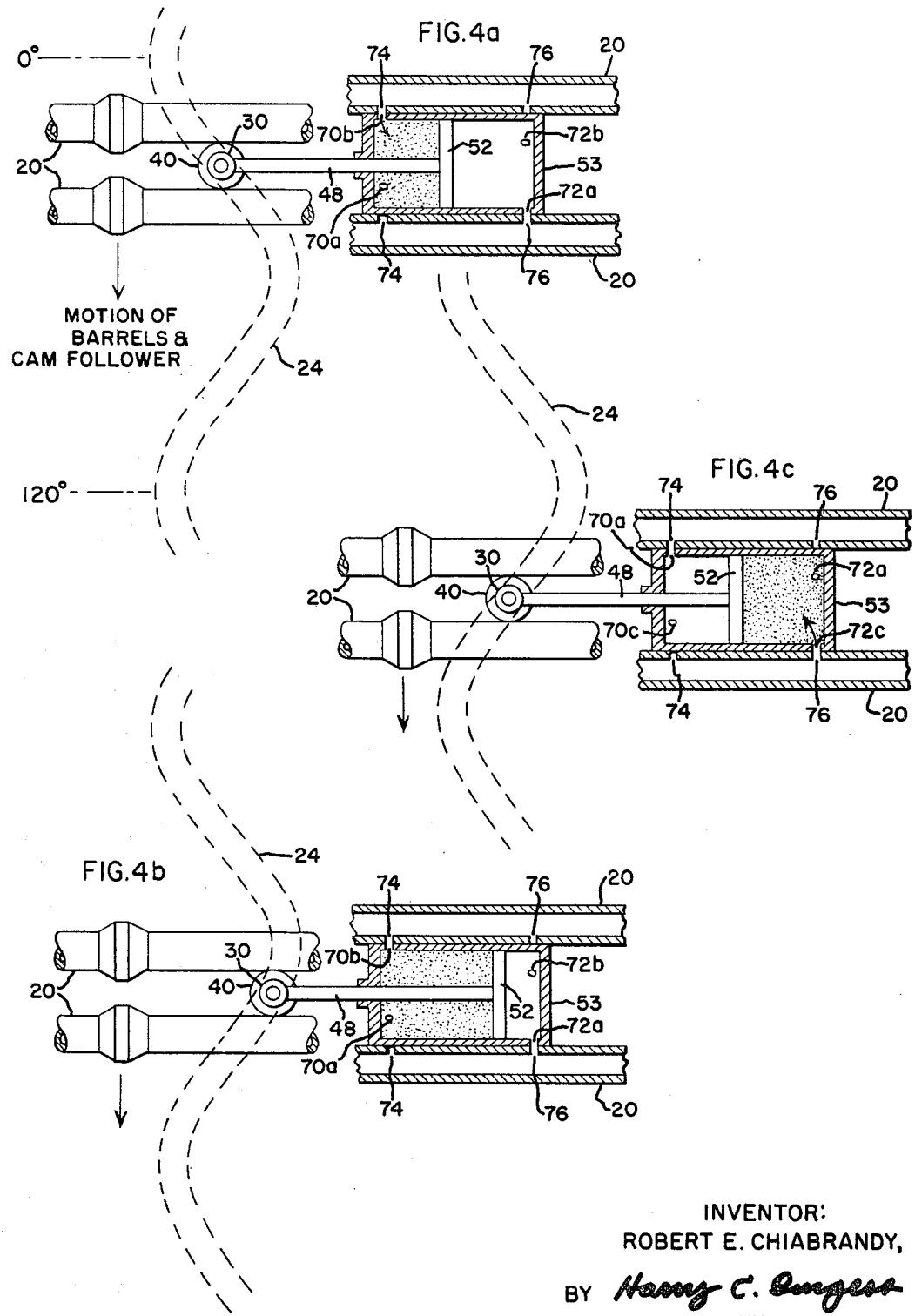

3,407,701
GAS DRIVE FOR A ROTATING BARREL GUN
Robert Ernest Chiabrandy, Burlington, Vt., assignor to
General Electric Company, a corporation of New York
Filed July 17, 1967, Ser. No. 653,917
8 Claims. (Cl. 89—126)

ABSTRACT OF THE DISCLOSURE

An improved gas drive for a modern version of the Gatling-gun, as exemplified in the U.S. patent to Otto—2,849,921. The drive includes a cylinder, located between the barrel grouping, having sets of passages at either end thereof in flow communication with ports in the barrels, whereby cartridge discharge gases reciprocally drive a piston in the cylinder which is operably connected to a cam follower engaged with a cam track rigidly affixed to the gun housing to effect one complete cycle of piston motion for every other barrel fired. The resulting multiple stroke drive of the single piston arrangement described provides increased starting torque and sustained drive power.

Background of the invention

Currently the military arsenal includes a very high rate of fire weapons patterned after the well-known Gatling-gun mechanism. This weapon, which has been selected for use in a variety of applications including aircraft and ground combat vehicles, essentially consists of a grouping of barrels circularly mounted on a rotor for rotation about a common gun axis. Earlier versions of the gun, such as is depicted in U.S. Patent 2,849,921—to Otto, utilized external hydraulic or electrical power to drive the rotor supported by bearings in a cylindrical housing. Recently it has been suggested to use the gases generated during discharge of the ammunition to drive the rotor. It has been found, for example, that sufficient power can be attained by a drive unit comprising a single piston and cylinder centrally mounted within the opening formed by the circular grouping of the gun barerls and utilizing gas tapped from some, but not all, of the barrels. The advantages claimed for such devices as, for example, the gas drive shown in U.S. Patent 3,311,022—Bernard et al., are reduced starter mechanism requirements and reduced drain on vehicle power systems. Obviously, this is an advantage in an aircraft installation where available power is limited and where any reduction in complexity, weight or size of on-board equipment is to be desired.

However, some useful combinations of gun and accesory equipment require drive power in excess of that which can be developed with such a drive. Accordingly, the previous gas drive systems, of which the aforementioned Patent 3,311,022 and U.S. Patent 3,263,565—Dragonetti et al., are illustrative, may still be improved upon, particularly in the area of steady state and acceleration power. That is, with increases in weapon size from the conventional 20 mm. aircraft calibre to 40 mm., or higher, for ground use, has come a need for increases in starter energy and more efficient use of the gases generated by cartridge discharge.

Accordingly, a general object of the present invention is the provision of an improved, more reliable gas drive for an automatic weapon operating on the Gatling-gun principle.

A more specific object of the present invention is the provision of an improved gas drive for an automatic weapon providing a substantial increase in both steady state driving power and acceleration power.

A further object of the invention is the provision of a gun gas drive wherein a single piston within a cylinder attached to the gun barrels operates so as to effectively use the gases generated by all of the cartridges discharged through a plurality of gun barrels mounted for rotation about a common gun axis in the manner of the so-called Gatling-gun.

Summary of the invention

These, and other objects of the invention, can be attained by the use of a single drive cylinder and piston assembly located centrally within the barrel grouping of a modern version of a weapon operating on the Gatling-gun principle, in combination with an externally located cam which provides for three double-acting strokes of the drive piston for each revolution of the gun rotor, rather than one double-acting stroke. The gun barrels, e.g., six in the preferred embodiment, are connected in sequence by gas passages or ports to alternate ends of the drive cylinder for improved speed control as the developed torque can be made to decrease rapidly as the gun runs above design speed. A helically shaped cam track having multiple lobes is provided in the externally located cam, which may comprise an extension of the gun housing. Sufficient circumferential length of the drive cam is provided with placement of the cam outside of the barrel grouping which has the further benefit of simplifying the present gas drive system. The drive cylinder and the gas connections to the gun barrels are also located further to the rear than has been the practice with the result that higher pressure gas is available for a longer time at each of the ports connecting the barrels to the cylinder, thus providing increased power output. The piston of the drive assembly is connected to an elongated rod which projects rearwardly (or forwardly) of the cylinder to support a cam follower assembly. The cam follower assembly derives angular restrain from a plurality of lateral rollers engaging the barrels or from a rotor extension piece, as well as axial support from the cam itself. In operation, as the cartridge discharge gases in the sequentially fired barrels are diverted into alternate ends of the drive cylinder, the drive piston is reciprocated through a complete cycle, whereby the cam acts on the cam follower rollers to cause partial (i.e., 120°) rotation of the barrel grouping for every other round discharged by the gun. In this way, the improved gas drive of the present invention provides a substantial increase in power normally available to cycle the gun at a sustained high rate of speed by utilizing gases from all the cartridges discharged in a multiple stroke piston and drive cam arrangement. Since the power developed by the multiple stroke drive is greatly increased over what has been available from single-stroke drive arrangements, the starting mechanism can be significantly reduced in size and complexity and the drive itself used to provide more rapid gun acceleration to the desired operating speed. Furthermore, since the multiple lobes of the cam can be made symmetrical for a gun with an even number of barrels, the cam load can be shared between two or more followers, if desired. Where sharing of the cam load is not desired the multiple lobes of the cam can be varied in slope or shape—in combinations of one or more lobes—to improve low and/or high speed power at the expense of mid-speed power, e.g., by firing a particular barrel at a given speed at a steeper point of the cam path, thereby providing different torque-speed profiles for different applications of the gun.

Brief description of the drawings

While the claims appended hereto distinctly claim and point out that which I regard as my invention, nevertheless further objects and advantages thereof will perhaps become more apparent from the following detailed description together with the accompanying drawings, in which:

FIG. 1 is a partial illustration, in dotted lines, of the overall gun configuration, together with an illustration of the drive cam housing and piston as viewed externally;

FIG. 2 is an enlarged longitudinal view, partially in cross-section, illustrating in more detail the components of the multiple-stroke gas drive mechanism as utilized with the modern version of the Gatling-gun;

FIG. 3 is a cross-sectional view along line 3 of FIG. 2; and

FIGS. 4a–4c illustrate, in a series of schematics, movement of the gas drive piston and cam follower rollers during cartridge discharge.

FIGS. 5a–5b are cross-sectional views along lines 5a and 5b of FIG. 2.

Detailed description of preferred embodiment

As shown in the drawings, and as is described in more complete detail in the aforementioned patent to Otto, the modern day version of the Gatling-gun depicted herein comprises an outer housing, indicated generally at 10, having an outer cylindrical bearing support member 12 enclosed thereby adjacent the forward end of the housing. Ball bearings 13 are retained between the outer member and an inner bearing support member 14 supported from the forward end of the rotor body 16. Threaded, at 18, or otherwise securely fixed in the forward portion of rotor 16 at equally spaced intervals about the gun axis, are the breech ends of a plurality of gun barrels 20. The gun illustrated has an even number of barrels (6) but, as stated above, an odd number could be utilized with the present invention. The housing 10 has a forwardly extending member, indicated generally at 21, affixed at 22 by bolts or the like, the member 21 enclosing the outer bearing support member. Housing member 21 carries external pads 23 to provide means for mounting the gun in a pod (not shown) or the like and also provides a cam, indicated at 24, as hereinafter described in detail. Internally of the housing member 21 is a cylindrical ring 25 supporting the rearward or breech end of the barrel group, the support being seated on the forward face of the rotor, at 26, and having a perforated end plate 27 accommodating the enlarged barrel portion 20a on each barrel. By extending the housing 10 forwardly, with member 21, the gas drive of the present invention is incorporated into the weapon shown with minimal alteration of the exterior configuration of the gun. Adapted to be engaged with the cam 24 are a plurality of cam follower rollers, one of which is shown at 30, supported on the end of a frame or spider, indicated generally at 32. Rollers 30, three in number in the disclosed embodiment, are each rotatably attached to an arm of the spider by a radial shaft 34 journaled in an opening 35 in the arm. The arms, indicated at 32a, 32b, and 32c, extend generally radially of the gun axis, as best seen in FIG. 3. The spider or frame 32 also supports an additional means in the form of a lateral support roller 40 secured to the inner end of shafts 34 by nuts 41. The lateral support rollers 40 are captured by bearing against the sides of the barrels 20 and cause the cam follower rollers 30 to rotate with the barrel group. The lateral rollers therefore follow a helical path, which is varying sinusoidally in pitch, about the major gun axis, while the rollers 30 are moving in the cam track or groove 24, as is more fully described hereinafter with reference to FIGS. 4a–4c. Frame 32 is supported on the rearward end of a piston shaft 48 received through a central opening 50 in the frame hub 32d, being retained thereat by a nut 51 threaded on the shaft end. The other end of the piston shaft or rod 48 terminates in an enlarged head or piston 52 slidably engageable in a stationary gas cylinder 53. The cylinder is fixedly clamped in an area defined by the circularly grouped barrels 20, the barrels being received in recesses 54 in the external surface of the cylinder wall, as seen in FIGS. 1 and 2. In the present invention the recesses 54 need not be keyed for use of different barrels, since all the barrels can be made exactly alike and hence all parts of the cylinder assembly are rotatably symmetrical. In this way drive assembly manufacture is greatly simplified.

As seen in the drawings, particularly FIGS. 2, 5a and 5b, a rearward and forward trio of gas passages 70 and 72, respectively, are provided in the drive cylinder 53. The respective passages of each trio are equally angularly spaced about the cylinder axis, with one trio being displaced 60° with respect to the other trio. Thus, there is a passage (viewed axially as in FIG. 3) every 60° about the gun axis, i.e., effectively one for each of the six barrels. These passage, which are labeled, respectively, 70a, 70b, 70c, and 72a, 72b and 72c in the drawings provide flow communication between the cylinder head and the barrels through sets of barrel ports 74 and 76 provided in each of the barrels 20, i.e., all of the barrels are ported to utilize the gases generated by cartridge discharge. Each gas port of the sets 74–76 is longitudinally spaced along the barrel from the other port on the same barrel to provide gas admission at either end of the piston in the improved, multiple stroke arrangement of the present invention. Since the unneeded ports can be closed by the gas cylinder wall at assembly all gun barrels can be manufactured identically. Furthermore, the respective passages of each trio 70 and 72 are aligned in a radial plane for greater efficiency since the disclosed external cam arrangement permits equivalent use of gas from all barrels, as well as being capable of greater operating loads than has been heretofore possible with the prior known devices. It should also be noted that passages 70 are all located close to the forward cylinder wall 53a to provide greater initial gas pressures than heretofore realized, as are the ports 72—with respect to the rear cylinder wall 53b—for the forward stroke. The forward wall of the drive cylinder 53 also includes a projecting flange 84 received in recesses 86 in the barrels to further locate the cylinder. In addition there is provided a forward barrel support or clamp 88 having rearwardly extending portions 89 which act to prevent misassembly of the cam follower support frame 32 with the barrel group. That is, the extensions 89 are located between adjacent barrels, as best seen in FIG. 3, in such a way that there can be no rotation of the spider 32 (about its axis) from its proper position. For example, if the rollers 30 and arms 32a, 32b or 32c were rotated 60°, this would cause reversed power output, i.e., the sets of passages 70 and 72 would, in effect, be reversed with respect to the respective barrel ports 74 and 76.

With the described arrangement it will be obvious that the piston and cam assembly are greatly simplified from the conventional Gatling-gun gas drive arrangement. As now to be described in detail, the improved gas drive arrangement of my invention also assures increased power for sustained gun cycling, as well as reduced starting torque requirements.

Since each barrel is now ported, relatively little external starting power is necessary to accelerate the gun to its full operating speed, which in this case may be as high as 6000 shots per minute (s.p.m.) or higher. The discharge of cartridges in each barrel 20 causes high pressure gases to jet through port 74 (or 76), for each barrel fired, and its aligned cylinder passage 70a, 70b, or 70c (or, alternatively, passage 72a, 72b or 72c) where the gases come into contact with one or the other, face of the double acting piston 52. Turning to FIGS. 4a–4c, it will be assumed for purposes of description only, since the exact position will be uncertain, that the piston head has reached the end of its rearward stroke and has moved slightly forward of the plane of passages 70, as seen in FIG. 4a. It will be noted in FIG. 4a that the cam follower roller 30 is part way down the forward slope of cam track 24, shown here in a developed plan view. Discharge gas from the firing barrel 20 is shown by the arrow entering the cylinder 53 through one of the cylinder passages, e.g., 70b, and leaking from the cylinder through the other two pasages 70a and 70c. However, since the pressure in the firing barrel is much greater than that in the cylinder, the inflow is much greater than the outflow. Therefore pressure in the rear end of the cylinder rises sharply. As the discharge gases entering gas cylinder 53 expand, piston 52 is forced forwardly. The corresponding travel of piston rod 48, support 32, lateral rollers 40, and cam rollers 30 cause the cam rollers to act on the cam 24. This cam action causes the roller support 32 to rotate about the axis of the barrel group, this rotation being transmitted to barrels 20 by the lateral support rollers 40 and thence to gas cylinder 52 and the gun rotor 16. This results in advancing the next successive barrel to the firing position. As the piston 52 moves forward, the combination of gas expansion and leakage out of the cylinder through the other two passages in the trio 70 acts to reduce the gas pressure in the cylinder. Finally, when pressure in the firing barrel 20 has dropped below that in the cylinder, all three passages 70 begin to act as exhaust ports, conducting gas back to their respective barrels. During the forward stroke, residual gas in the forward end of the cylinder 52 is forced out through the three passages 72 into the other three barrels connected thereto through ports 76. After the conclusion of the forward stroke of the piston 52, further rotation of the gun, due to its inertia, causes the cam 24 to move the piston rod 48 to the rear. Part way through the rearward stroke the next barrel 20 in sequence is fired and gas enters the front end of the cylinder 53, through port 76 and aligned passage 72c, as shown in FIG. 4c. The piston 52 is now driven to the rear in the complement of the action described above, and due to the reversed cam slope, as seen in the developed view of FIG. 4c, the gun rotor is driven to bring the next barrel to firing position.

It was noted that passages 70, 72 for the six barrels are arranged so there are three openings at each end of the cylinder to control cam complexity, i.e., a three-lobed cam is used, whereas six lobes would be needed if all passages were in one end. Also, gas would leak out at an excessive rate. Furthermore, inertia loads of piston and roller are greatly reduced from what would be needed for a six-lobed cam. Additionally, it should be noted that the cam 24 is at a maximum radius making it relatively simple to provide increased built-in load capacity. The known drive arrangements are somewhat more limited in potential for increased piston size since, if increased excessively, gun envelope (hence, weight) can grow to an unacceptable dimension.

It may also be pointed out that it is not necessary to compromise the position of the piston 52 at which gas is admitted to the cylinder 53, since all barrels can be fired at the same relative position with respect to the end of cylinder at which gas is to be admitted. This feature makes it possible to tailor the torque vs. speed curve of my improved gas drive to specific applications, since a change in the cam shape can be made to affect the power developed by all of the barrels simultaneously. Thus, the cam curve can be altered so as to increase or decrease the amount of clearance volume at the instant of firing which varies the amount of gas used by the drive, or to locally increase the cam slope to give a greater amount of piston displacement during the period of greatest gas pressure available in the cylinder, thereby increasing power in the form of developed torque.

Because a time delay exists between a fixed angular position of the gun rotor at the instant firing is initiated and the point at which exhaust gas enters the cylinder 53 from the firing barrel 20, the pressure impulse felt by the piston 52 will occur further in the stroke as gun speed is increased. Thus, another feature of the improved drive described herein is that when the gun tends to run at greater than design speed, a relatively high residual pressure will exist in the rearward end of the cylinder 53 as the piston begins its travel on the rearward sloping portion of the cam track, as shown in FIG. 4b. Since at a high gun speed the exhaust gas will not yet be available in quantity at one of the passages 72, the residual gas pressure in the rearward portion of cylinder 53 acts to retard rotation of the gun, thereby automatically reducing the speed to design rate. It will be understood that following the completion of the rearward stroke there is available a similar retarding action, at high gun speeds, wherein the cam follower roller is starting on the forward sloping portion of the cam with the residual gases being in the forward end of the cylinder, at this point.

It will be understood, therefore, that the improved gas drive system described hereinabove incorporates a multiple stroke driving arrangement since the cam 24 has three equal lobes (for the disclosed six barrel gun) instead of the conventional single lobe and, thus, the piston travels one complete stroke for each and every round fired. This results in increased low-speed power and incresed sustained—and reserve—power at the rated operating speed. Gun speed regulation is also enhanced since all barrels contribute and, thus, all barrels can furnish braking torque, as required. Mechanically, cam loads are minimized since the cam track diameter is maximized—within a given gun envelope—and the cam followers are equispaced about the gun axis, further minimizing any undesirable overturning moments in the design.

The preferred embodiment as described herein is for purposes of illustration only and it is intended that all modifications and variations which will occur to those skilled in the art are to be included within the scope of the claims appended hereto.

What I claim as new and desire to secure by Letters Patent of the United States is:

1. An improved self-powered gas drive apparatus for an automatic weapon having a plurality of barrels radially grouped for rotation about a common central axis comprising:

a gas drive cylinder coaxially located within said barrel grouping and having an outer wall partially longitudinally coextensive of said barrels and in fixed abutment therewith, whereby said cylinder is rotatable with said barrels;

a drive piston reciprocally movable in said cylinder along said axis;

an actuator rod affixed to said piston at one end thereof, the other end of said rod extending axially externally of said gas cylinder;

a cylindrical housing member surrounding said barrel grouping in a fixed, spaced relationship with respect thereto;

interengaging cam means on said housing and said rod adjacent said other end thereof;

a first set of gas passages through said cylinder wall and disposed in a first plane normal to said axis adjacent the rearward end of said cylinder, respective ones of the passages of said first set being in alignment with respective ones of a first plurality of gas ports in said barrels;

a second set of gas passages through said cylinder wall and disposed in a second plane normal to said axis adjacent the forward end of said cylinder, respective ones of the passages of said second set being radially displaced from the passages of said first set and being in alignment with respective ones of a second plurality of gas ports in said barrels, whereby the gases from successively discharged cartridges are directed alternatingly against rearward and forwardly facing surfaces of said piston, thereby to cause one stroke of said piston along said axis for each cartridge discharged in succession, the resultant continuous reciprocal movement of said piston causing said interengaging cam means to rotate said rotor.

2. The apparatus of the invention according to claim 1 wherein said barrel grouping includes an even number of barrels, wherein their is an individual gas passage in said first set for every other barrel starting with a first barrel, and wherein there is an individual gas passage in said second set for every other barrel starting with the barrel next adjacent said first barrel, respective ones of the barrel ports of said first and second pluralities, respectively, on successive barrels starting with said first barrel being alternatingly in flow communication with individual ones of said first and second sets of gas passages, also respectively.

3. The apparatus of the invention according to claim 2 wherein the respective ones of said first and second sets of passages are so arranged and radially displaced on successive barrels, starting with said first barrel, that at higher than normal barrel group rotating speeds relatively high residual gases exist in said cylinder on one side of said piston as a result of a first cartridge discharge, with respect to the gas entering said piston on the other side of said piston, as a result of discharge of the next succeeding cartridge, whereby the succeeding piston stroke is retarded for automatic reduction in weapon speed.

4. The apparatus of the invention according to claim 1 wherein said interengaging cam means comprises a first plurality of rollers rotatably supported at said other end of said actuator rod intermediate and radially outward of barrels of said grouping, and a generally helically-shaped continuous cam track in said housing adapted to receive said rollers for co-action therewith in response to said reciprocal piston movement.

5. The apparatus of the invention according to claim 4 wherein said other end of said actuator rod further supports a second plurality of rollers received between and in relatively moving engagement with adjacent pairs of barrels of said grouping, whereby said second plurality of rollers laterally support said actuator rod and first plurality of rollers during said reciprocating movement.

6. An improved self-powered gas drive apparatus for an automatic weapon having a plurality of barrels radially grouped for rotation about a common central axis comprising:
- a gas drive cylinder coaxially located within said barrel grouping and having an outer wall partially longitudinally coextensive of said barrels and in fixed abutment therewith, whereby said cylinder is rotatable with said barrels;
- a drive piston reciprocally movable in said cylinder along said axis;
- an actuator rod affixed to said piston at one end thereof, the other end of said rod extending axially externally of said gas cylinder;
- cam follower means affixed to said other end of said rod;
- a first set of gas passages through said cylinder wall and disposed in a first plane normal to said axis adjacent the rearward end of said cylinder, respective ones of the passages of said first set being in alignment with respective ones of a first plurality of gas ports in said barrels;
- a second set of gas passages through said cylinder wall and disposed in a second plane normal to said axis adjacent the forward end of said cylinder, respective ones of the passages of said second set being radially displaced from the passages of said first set and being in alignment with respective ones of a second plurality of gas ports in said barrels; and
- the respective barrel ports of said first and second pluralities being longitudinally separated and radially aligned, whereby on successive barrels alternate rearwardly and forwardly located ports only are in flow communication with their respective cylinder wall passages;
- external cam means surrounding said barrel grouping and engaging said cam followers, said external cam means being rigidly affixed with respect to said rotor, wherein the gases from successively discharged cartridges are directed alternatingly against rearwardly and forwardly facing surfaces, respectively, on said piston to cause one stroke of said piston along said axis for each cartridge discharged in succession, whereby the resultant continuous reciprocal movement of said piston causes said external cam means to act on said cam follower means for rotation of said rotor.

7. In an automatic weapon having a rotor, a housing surrounding and supporting said rotor for rotation about its longitudinal axis, a plurality of barrels mounted at the breech ends thereof on said rotor in an equally-spaced radial grouping about said axis, and means including a plurality of bolts reciprocally movable in axial tracks in the rotor periphery during weapon operation to move cartridges to a fixed battery station for insertion into successive ones of said breech ends, the improvement in gas drive means for self-powering said rotor about said axis to pass said breech ends successively through said battery station wherein said inserted cartridges are discharged in succession, said improved gas drive means including:
- a drive cylinder fixedly disposed within the barrel grouping in coaxial alignment therewith, an outer surface of the cylinder wall having a plurality of circumferentially spaced longitudinal recesses for receiving said barrels;
- a drive piston received in said cylinder and having rearwardly and forwardly facing planar surfaces thereon;
- an actuator rod attached at one end to one of said surfaces and extending axially of said weapon externally of said cylinder;
- a first set of gas passages through said cylinder wall at said recesses and disposed in a first plane normal to said axis adjacent the rearward end of said cylinder, respective ones of the passages of said first set being in alignment with respective ones of a first plurality of gas ports in said barrels;
- a second set of gas passages through said cylinder wall at said recesses and disposed in a second plane normal to said axis adjacent the forward end of said cylinder, respective ones of the passages of said second set being radially displaced from the passages of said first set and being in alignment with respective ones of a second plurality of gas ports in said barrels, the respective barrel ports of said first and second pluralities being longitudinally separated and radially aligned, whereby on successive barrels alternate rearwardly and forwardly located ports only are in flow communication with their respective cylinder wall passages;
- a support member fixedly attached to the other end of said actuator rod and having radially directed arms projecting between adjacent ones of said barrels;
- cam follower means at the extremity of each of said support member arms comprising a shaft rotatably supported in a bore in each arm and a first roller mounted on the radially outermost end of each shaft; and
- an external cam track surrounding said barrel grouping and engaging said cam followers, said cam track being rigidly affixed to said housing, the gases from successively discharged cartridges being directed alternatingly against said rearwardly and said forwardly facing piston surfaces, respectively, to cause one stroke of said piston along said axis for each cartridge discharged in succession, whereby the resultant continuous reciprocal movement of said piston causes said cam track to act on said cam followers for rotation of said rotor.

8. The apparatus of the invention according to claim 7 including a second plurality of rollers, respective ones of said second plurality being rotatably mounted at the radially innermost end of each shaft for relatively moving engagement with adjacent pairs of barrels for lateral support of said support member during said reciprocal movement.

References Cited

UNITED STATES PATENTS 3,311,022   3/1967   Bernard et al. _____ 89—126

BENJAMIN A. BORCHELT, *Primary Examiner.*

S. C. BENTLEY, *Assistant Examiner.*